US011221906B2

(12) United States Patent
LePera et al.

(10) Patent No.: US 11,221,906 B2
(45) Date of Patent: Jan. 11, 2022

(54) DETECTION OF SHARED MEMORY FAULTS IN A COMPUTING JOB

(71) Applicant: International Business Machines Corporation, Armonk, NY (US)

(72) Inventors: William P. LePera, Wappingers Falls, NY (US); Sameh Sherif Sharkawi, Cypress, TX (US); Austen William Lauria, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/739,613

(22) Filed: Jan. 10, 2020

(65) Prior Publication Data

US 2021/0216387 A1    Jul. 15, 2021

(51) Int. Cl.
*G06F 11/07* (2006.01)
*G06F 9/54* (2006.01)

(52) U.S. Cl.
CPC ............ *G06F 11/079* (2013.01); *G06F 9/546* (2013.01); *G06F 11/0724* (2013.01); *G06F 11/0757* (2013.01); *G06F 11/0772* (2013.01); *G06F 2209/547* (2013.01)

(58) Field of Classification Search
CPC ...... G06F 11/079; G06F 11/3636; G06F 9/54; G06F 9/451; G06F 9/468; G06F 11/0724; G06F 11/0757; G06F 11/0772; G06F 9/546; G06F 2209/547

See application file for complete search history.

(56) References Cited

U.S. PATENT DOCUMENTS

| | | | |
|---|---|---|---|
| 9,037,898 B2 | 5/2015 | Arroyo et al. | |
| 9,432,298 B1 | 8/2016 | Smith | |
| 10,135,689 B2 | 11/2018 | Day | |
| 10,146,653 B2* | 12/2018 | Brown | G06F 11/2242 |
| 2013/0139178 A1* | 5/2013 | Hu | H04L 41/042 |
| | | | 719/313 |
| 2015/0067819 A1* | 3/2015 | Shribman | H04L 67/32 |
| | | | 726/12 |
| 2016/0261558 A1* | 9/2016 | Herrero | H04L 12/4633 |
| 2018/0225230 A1* | 8/2018 | Litichever | G06F 21/82 |
| 2019/0286598 A1* | 9/2019 | Chivetta | H04L 67/06 |

OTHER PUBLICATIONS

Bhattacharyya et al., "Scalable, Event Based, Bottom-Up, Distributed Fault Management for Use in Dense Computing Systems (Micro Servers) and Traditional Rack and Blade Servers", An IP.com Prior Art Database Technical Disclosure, IP.com No. IPCOM000241310D, IP.com Electronic Publication Date: Apr. 15, 2015, Copyright 2015 Cisco Systems, Inc., 14 pages.

(Continued)

*Primary Examiner* — Jigar P Patel
(74) *Attorney, Agent, or Firm* — David Woycechowsky

(57) ABSTRACT

Technology for determining whether an inter-process type message has been successfully sent from a first process to a second process running on a single computer with a single processor(s) set. A variable (for example, a bit value) is used to indicate whether the inter-process message has been communicated between the processes. A timer and a predetermined timeout threshold are used to determine if the inter-process message has been pending for too long without being successfully communicated.

6 Claims, 3 Drawing Sheets

(56) References Cited

OTHER PUBLICATIONS

IBM "Method to Improve Runtime Performance During Job Migration in a Distributed Memory, High Performance Computing System", An IP.com Prior Art Database Technical Disclosure, Original Publication Date: Jan. 14, 2010, IP.com No. IPCOM000191762D, IP.com Electronic Publication Date: Jan. 14, 2010, 5 pages.
Kharbas et al., "Assessing HPC Failure Detectors for MPI Jobs", 2017, 8 pages.
Netti et al., "Online Fault Classification in HPC Systems through Machine Learning", arXiv:1810.11208v2 [cs.DC] Jul. 11, 2019. 14 pages.

* cited by examiner

DETECTION OF SHARED MEMORY FAULTS IN A COMPUTING JOB

The U.S. Government may have certain rights in this invention pursuant to U.S. Department of Energy Contract No. B604134.

BACKGROUND

The present invention relates generally to the field of inter-process type protocol stacks (sometimes herein referred to as "communications stacks") in a shared computer memory, and more particularly to faults that may occur in a shared memory.

High-performance computing (HPC) systems utilize parallel processing for running advanced application programs efficiently, reliably and quickly. To meet the needs of scientific research and engineering simulations, supercomputers are growing at an unrelenting rate.

The Wikipedia entry for "processes," as 19 Sep. 2019, states as follows: "In computing, a process is the instance of a computer program that is being executed by one or many threads. It contains the program code and its activity. Depending on the operating system (OS), a process may be made up of multiple threads of execution that execute instructions concurrently. While a computer program is a passive collection of instructions, a process is the actual execution of those instructions. Several processes may be associated with the same program; for example, opening up several instances of the same program often results in more than one process being executed. Multitasking is a method to allow multiple processes to share processors (CPUs) and other system resources. Each CPU (core) executes a single task at a time. However, multitasking allows each processor to switch between tasks that are being executed without having to wait for each task to finish. Depending on the operating system implementation, switches could be performed when tasks perform input/output operations, when a task indicates that it can be switched, or on hardware interrupts." (Footnotes omitted)

The Wikipedia entry for "inter-process communication", as of 19 Sep. 2019, states as follows: "In computer science, inter-process communication or interprocess communication (IPC) refers specifically to the mechanisms an operating system provides to allow the processes to manage shared data. Typically, applications can use IPC, categorized as clients and servers, where the client requests data and the server responds to client requests. Many applications are both clients and servers, as commonly seen in distributed computing. Methods for doing IPC are divided into categories which vary based on software requirements, such as performance and modularity requirements, and system circumstances, such as network bandwidth and latency . . . . [In] shared memory [type inter-process communications,] multiple processes are given access to the same block of memory which creates a shared buffer for the processes to communicate with each other." (Footnotes omitted)

The Wikipedia entry for "protocol stack" as of 16 Sep. 2019, states as follows: "The protocol stack or network stack is an implementation of a computer networking protocol suite or protocol family. Some of these terms are used interchangeably but strictly speaking, the suite is the definition of the communication protocols, and the stack is the software implementation of them. Individual protocols within a suite are often designed with a single purpose in mind. This modularization simplifies design and evaluation. Because each protocol module usually communicates with two others, they are commonly imagined as layers in a stack of protocols. The lowest protocol always deals with low-level interaction with the communications hardware. Each higher layer adds additional capabilities. User applications usually deal only with the topmost layers . . . . Imagine three computers: A, B, and C. A and B both have radio equipment, and can communicate via the airwaves using a suitable network protocol (such as IEEE 802.11). B and C are connected via a cable, using it to exchange data (again, with the help of a protocol, for example Point-to-Point Protocol). However, neither of these two protocols will be able to transport information from A to C, because these computers are conceptually on different networks. An inter-network protocol is required to connect them. One could combine the two protocols to form a powerful third, mastering both cable and wireless transmission, but a different super-protocol would be needed for each possible combination of protocols. It is easier to leave the base protocols alone, and design a protocol that can work on top of any of them (the Internet Protocol is an example). This will make two stacks of two protocols each. The inter-network protocol will communicate with each of the base protocol in their simpler language; the base protocols will not talk directly to each other."

As is apparent from the preceding paragraph a "protocol stack" is a general term that can broadly refer to an: (i) inter-network type protocol stack for handling data communications across different networks; (ii) network type protocol stacks for handling data communications between multiple computers on a common network; and/or (iii) inter-process type protocol stacks for handling data communications between processes running within a single computer. "Inter-process type protocol stacks" are sometimes herein referred to as "communications stacks."

Inter-process type protocol stacks are software components that work together to format, deliver, and receive messages from one process to another in a manner that is understood by both of the processes. The components are often arranged in layers to isolate specific functions or expose programming interfaces. Typically, an inter-process protocol stack has more than one layer so that messages can be translated from one protocol to another, but inter-process messages are often communicated between process in a single protocol, meaning that only a single layer of the inter-process type protocol stack is needed and used.

SUMMARY

According to an aspect of the present invention, there is a method, computer program product and/or system that performs the following operations (not necessarily in the following order): (i) instantiating a first process on the processor(s) set; (ii) instantiating a second process on the processor(s) set; (iii) generating, by the first process, a first inter-process message to be communicated to the second process; (iv) setting a variable with a first value indicating that the first inter-process message has not yet been communicated to the second process; (v) sending the first inter-process message from the first process running in the processor(s) set to the shared memory area; (vi) subsequent to sending the first inter-process message to the shared memory area, determining that the first inter-process message has not been communicated to the second process based on the first value of the variable; and (vii) responsive to the determination that the first inter-process message has

DETAILED DESCRIPTION

Figure 1:
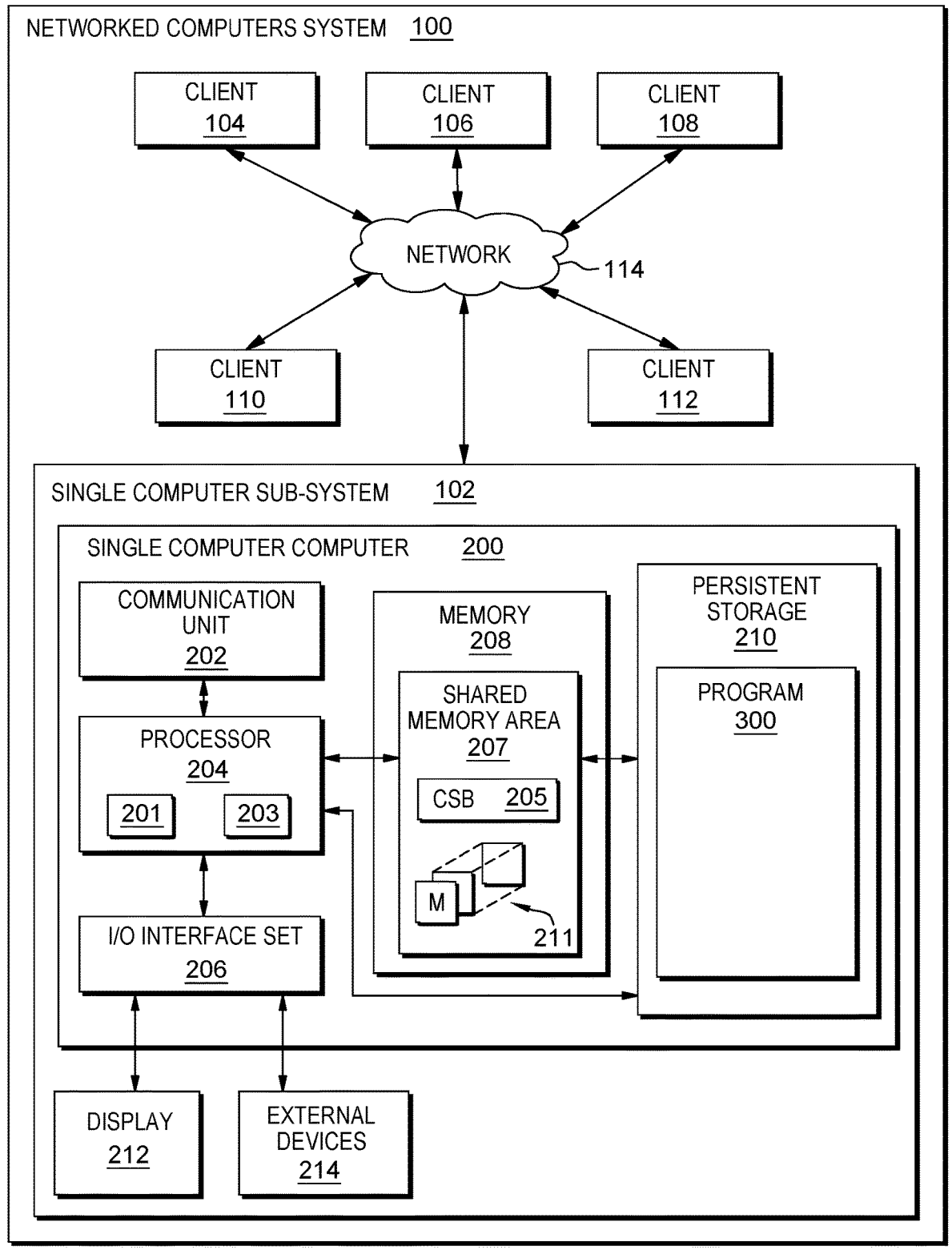
FIG. 1 is a block diagram view of a first embodiment of a networked computers system including a single computer subsystem which is a first embodiment of a system according to the present invention.

Some embodiments of the present invention are directed to determining whether an inter-process type message has been successfully sent from a first process to a second process running on a single computer with a single processor(s) set. A variable (for example, a bit value) is used to indicate whether the inter-process message has been communicated between the processes. A timer and a predetermined timeout threshold are used to determine if the inter-process message has been pending for too long without being successfully communicated. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: single computer subsystem 102 (sometimes herein referred to, more simply, as subsystem 102); client subsystems 104, 106, 108, 110, 112; and communication network 114. Single computer subsystem 102 includes: single computer 200; communication unit 202; and processor set 204 (including first running process 201 and second running process 203); input/output (I/O) interface set 206; memory 208 (including shared memory area 207); persistent storage 210; display 212; external device(s) 214; and program 300. The protocol stack may include additional layers (not shown). Shared memory 207 includes: completion status bit 205 and inter-process messages 211.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
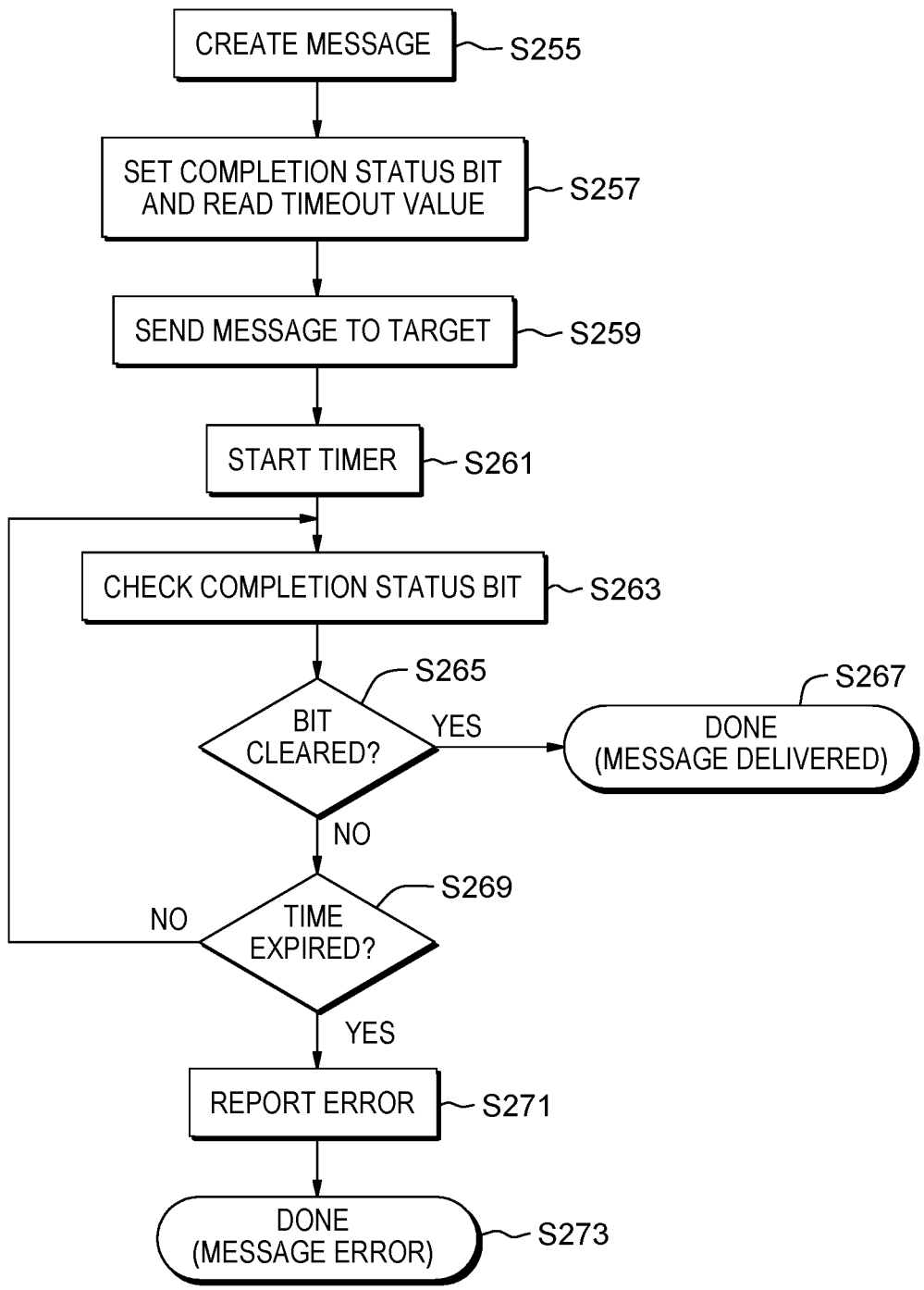
FIG. 2 is a flowchart showing a first embodiment method performed, at least in part, by the first embodiment system.
Figure 3:
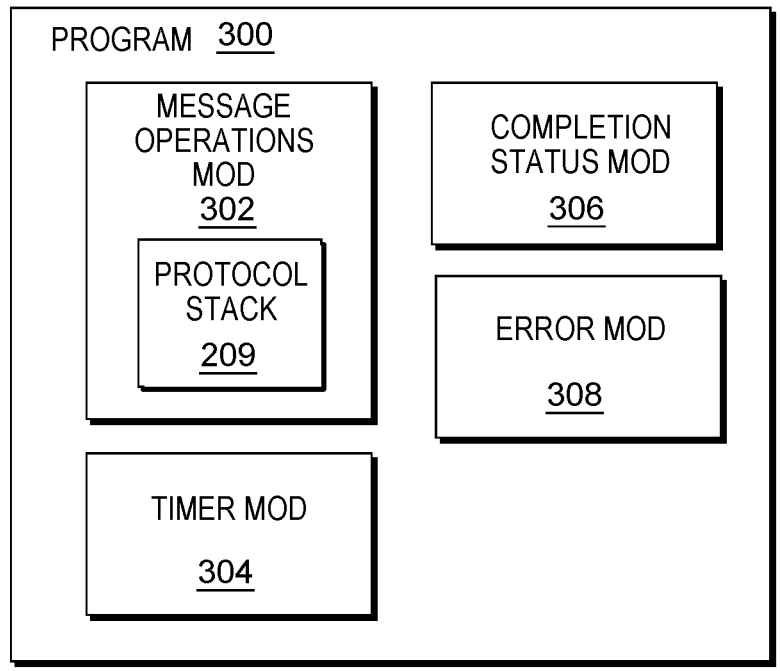
FIG. 3 is a block diagram showing a machine logic (for example, software) portion of the first embodiment system.
Figure 4:
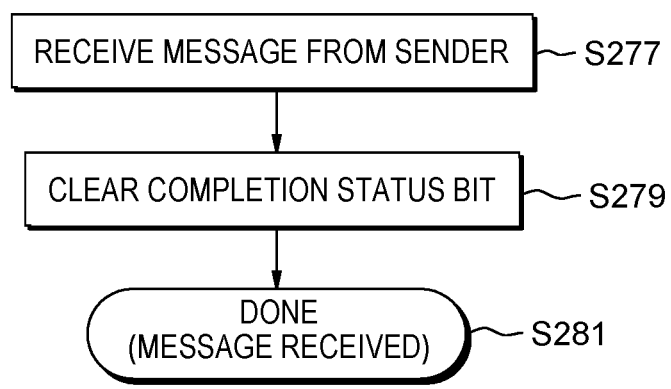
FIG. 4 is a flowchart showing a second embodiment method performed, at least in part, by the first embodiment system.

As shown in FIG. 1, networked computers system 100 is an environment in which an example method according to the present invention can be performed. As shown in FIG. 2, flowchart 250 shows an example method for creating and sending inter-process type messages according to the present invention. As shown in FIG. 4, flowchart 275 shows an example method for receiving inter-process type messages according to the present invention. As shown in FIG. 3, program 300 performs or controls the performance of at least some of the method operations of flowcharts 250 and 275. This method and associated software will now be discussed, over the course of the following paragraphs, with extensive reference to the blocks of FIGS. 1, 2, 3 and 4.

The method of flowchart 250 (see FIG. 2), focusing on the sender process, will now be discussed. Processing begins at operation S255, where first process 201 creates an inter-process type of message intended to be communicated to second process 203. As shown in FIG. 1, both first process 201 and second process 203 are running on a common processor 204. Moreover, in this example both first process 201 and second process 203 are running on the same core of common processor 204. Alternatively, the 2 communicating processes may be running on separate cores of a common processor or on different processors of a common processor set for a single computer. However, because the message is an inter-process type message, both of the processes must be running on the same computer (this is sometimes herein referred to as "running on the same computer system"). In this example, the content of the message is that: a data packet, where first process 201 is doing computing work based on source data, calculates a result, and sends that result to second process 203 process for further processing. Another example of typical message subject matter would be a control message, where one process sends a request for data to another process, along with a memory location specifying where the data should be written.

Processing proceeds to operation S257, where completion status module ("mod") 306: (i) sets a completion status bit (see completion status bit 205 in FIG. 1) for the message; and (ii) reads a timeout value for the message from timer mod 304. In this embodiment, the instructions for this operation S257 are implemented in the code for protocol stack 209 of mod 302. In this embodiment, protocol stack 209 is a currently conventional protocol stack in respects other than the inclusive of instructions to control the value of the completion status bit on an on-going basis as new messages are received and communicated through the shared memory area. Alternatively, control of the value of the completion bit may be controlled by instructions in other parts of program 300, or in other parts of the computer system that are outside of program 300.

Processing proceeds to operation S259, where message operations mod 302 sends the message (that is, one of the messages of inter-process messages 211) from first process 201 to shared memory area 207. Shared memory area 207 is used, as discussed above in the Background section, as a place to temporarily store inter-process type messages as they are being communicated from one process to another.

Processing proceeds to operation S261, where message operations mod 302 starts a timer included in time or mod 304. This timer is used to make sure that the inter-process messages communicated before an undue amount of time passes.

Processing proceeds to operation S263, where completion status mod 306 checks completion status bit 205 to see whether the inter-process type message has been communicated to second process 203. In this example, completion status bit 205 will be set to have a value of one (1) before the message is communicated to second process 203. Again, in this particular example, this change in value of the completion status bit is controlled by protocol stack 209.

Processing proceeds to operation S265, where completion status mod 306 determines whether the completion bit has cleared. If it has cleared, then processing proceeds to operation S267, where the method of flowchart 250 ends with a determination that the inter-process message was duly delivered to second process 203.

On condition that it is determined at operation S265 that the message completion bit has not been cleared, then processing proceeds to operation S269, where mod 306 determines whether the timer of timer mod 304 has expired. If it has not expired, then processing loops back to operation S263. On the other hand, if the timer has expired then processing proceeds to operation S271, where error mod 308 reports the error.

In response to the report of the error, there can be a number of actions taken, such as and without limitation: (i) the sending process may attempt to re-send the message; (ii) the sending process may report back to its caller (the process that asked the message to be sent) that the message was not delivered and let that process determine the proper action; and/or (iii) the sending process may report the error in a message and abort.

Processing proceeds from operation S271 to the end of the process at operation S273. This closes the discussion of flowchart 250. The method of flowchart 275 (see FIG. 4), focusing on the recipient process, will now be discussed in the following paragraphs.

Processing begins at operation S277, where second process 203 receives the inter-process message from shared memory area 207.

Processing proceeds to operation S279, where completion status mod 306 determines that the message has been received and clears completion status bit 205.

Processing proceeds to operation S281, where the process is completed from the perspective of the recipient process.

III. Further Comments and/or Embodiments

Some embodiments of the present invention recognize the following facts, potential problems and/or potential areas for improvement with respect to the current state of the art: (i) as supercomputers and software stacks increase in size, high performance computing jobs become more complex; (ii) any inter-process communications fault can cause a computing job to terminate; (iii) when messages are sent across a communications network, some faults can be detected by monitoring the message completion status; (iv) there are other cases where the processes are running on the same computer system, and are exchanging messages through a common shared memory area; and/or (v) in the situation described in the preceding item on this list, there is no communications status to check because the message does not pass through a communications network.

Some embodiments of the present invention may include one, or more, of the following operations, features, characteristics and/or advantages: (i) detects faults in a high performance computing shared memory path; (ii) a fault-tolerant communications stack can detect and handle faults, rather than terminate the job; (iii) enables a communications stack to detect faults between processes running within the same computer system and exchanging messages by means of a common shared memory area; and/or (iv) a fault tolerant communications stack can detect failed shared memory messages between communications endpoints running on the same computer system.

A method according to an embodiment of the present invention includes the following operations (not necessarily in the following order): (i) a communications stack is initialized and establishes a shared memory area to be used by communications endpoints running on the same computer system; (ii) during initialization, the communications stack will read a shared memory message timeout value from the operating environment; (iii) when the communications stack creates the message packet within the shared memory area, it will also set a completion status bit within the packet; (iv) when the destination endpoint reads the message packet, it will clear the completion status bit; (v) when the user application calls the communications stack to advance communications status, the stack will check the message packet for the completion status bit (the stack will expect the bit to have been cleared by the destination endpoint within the shared memory message timeout value); (vi) if the bit has not been cleared by the destination endpoint within the timeout period, the communications stack will return a timeout message for the packet; and (vii) in response to the return of the message for the package, the communications stack handles the fault indicated by the timeout message, rather than by terminating the job.

Further with respect to operation (ii) of the method described in the preceding paragraph, the stack will have a default value for this timeout. The default value may be modified, by an application, by setting a different value in the operating environment.

Some embodiments of the present invention may include one, or more, of the following operations, features, characteristics and/or advantages: (i) is not hardware-specific, instead it is a method implemented by software; (ii) describes a method to detect failures within a single computer system (that is, a single computer); (iii) does not make use of any inter-network communication, detect failures between processes running within a single computer; (iv) is implemented below the MPI (message passing interface) level, within the software protocol stack. In addition, some embodiments of the present invention do not send additional check or heart beat messages; rather, it sets a flag bit on an existing message and uses it to determine the delivery state; and/or (v) detects faults that occur when exchanging messages within a software protocol within a single computer.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a single computer including a processor(s) set and a memory including a shared memory area, the CIM comprising:

instantiating a first process on the processor(s) set, with
    the first process being is an instance of a first computer program that is being executed by one, or more, thread(s), with program code of the first computer program and activity of the first computer program;

instantiating a second process on the processor(s) set, with the second process being is an instance of a second computer program that is being executed by one, or more, thread(s), with program code of the second computer program and activity of the second computer program;

generating, by the first process, a first inter-process message to be communicated to the second process with the first inter-process message;

setting a variable with a first value indicating that the first inter-process message has not yet been communicated to the second process;

sending the first inter-process message from the first process running in the processor(s) set to a high performance computing shared memory path;

subsequent to sending the first inter-process message to the shared memory area, determining that the first inter-process message has not been communicated to the second process based on the first value of the variable;

responsive to the determination that the first inter-process message has not been communicated to the second process, detecting a fault in the high performance computing shared memory path with respect to communication of the first inter-process message; and detecting and handling the fault using a fault-tolerant communications stack to avoid terminating a job.

2. The CIM of claim 1 further comprising:

at the time the first inter-process message is sent from the first process to the shared memory area, beginning to count time elapsed; and determining that the time elapsed exceeds a predetermined threshold value and that the variable still has the first value;

wherein the determination that the first inter-process message has not been communicated to the second process is based on the determination that the elapsed time has exceeded the predetermined threshold value and that the first variable still has the first value.

3. The CIM of claim 1 further comprising:

responsive to the report that an error has occurred, taking at least one of the following responsive actions: (i) attempting to re-send the message, (ii) reporting back to the first process that the message was not delivered and determining, by the first process, a proper course of action, and/or (iii) reporting the error in a message and aborting.

4. The CIM of claim 1 wherein the processor(s) set is limited to a single processor unit.

5. The CIM of claim 1 wherein the shared memory area is a block of memory to which the first and second processes have access, and which creates a shared buffer for the first and second processes to communicate with each other.

6. The CIM of claim 1 wherein the first computer program is the same as the second computer program.

* * * * *